US012293848B2

(12) United States Patent
Artman et al.

(10) Patent No.: US 12,293,848 B2
(45) Date of Patent: May 6, 2025

(54) COAXIAL NEEDLE TECHNETIUM ELUTION GENERATOR

(71) Applicant: BWXT Isotope Technology Group, Inc., Lynchburg, VA (US)

(72) Inventors: Thomas Alan Artman, Forest, VA (US); Christopher Sean Fewox, Forest, VA (US); Benjamin Daniel Fisher, Lynchburg, VA (US); Bryan Blake Wiggins, Forest, VA (US)

(73) Assignee: BWXT Isotope Technology Group, Inc., Lynchburg, VA (US)

( * ) Notice: Subject to any disclaimer, the term of this patent is extended or adjusted under 35 U.S.C. 154(b) by 438 days.

(21) Appl. No.: 17/563,211

(22) Filed: Dec. 28, 2021

(65) Prior Publication Data

US 2022/0208407 A1 Jun. 30, 2022

Related U.S. Application Data

(60) Provisional application No. 63/131,554, filed on Dec. 29, 2020.

(51) Int. Cl.
*G21G 4/06* (2006.01)
*G21G 1/00* (2006.01)

(52) U.S. Cl.
CPC ............... *G21G 4/06* (2013.01); *G21G 1/001* (2013.01); *G21G 2001/0042* (2013.01)

(58) Field of Classification Search
CPC .......... G21G 4/06; G21G 1/001; G21G 1/005; G21G 2001/0042
See application file for complete search history.

(56) References Cited

U.S. PATENT DOCUMENTS 3,446,965 A * 5/1969 Groves .................. G21F 7/068
976/DIG. 374
3,749,556 A 7/1973 Barak et al.
(Continued)

FOREIGN PATENT DOCUMENTS

AU 2014 342 231 A1 5/2016
CN 104788081 A 7/2015
(Continued)

OTHER PUBLICATIONS

Knapp et al., Re-emergence of the important role of radionuclide generators to provide diagnostic and therapeutic radionuclides to meet future research and clinical demands, Journal of Radioanalytical and Nuclear Chemistry 302(3) (2014) (Year: 2014).*
(Continued)

*Primary Examiner* — David E Smith
(74) *Attorney, Agent, or Firm* — Nelson Mullins Riley & Scarborough LLP

(57) ABSTRACT

An elution generator including an elution column having a container defining an interior volume and a septum, a radiation shield having an upper shield portion defining a central recess and a coaxial flow needle extending downwardly into the central recess, and a lower shield portion having body portion defining a central recess, wherein the elution column is disposed in the central recess of the lower shield portion, the body portion of the lower shield portion is disposed in the central recess of the upper shield portion, and the coaxial flow needle extends downwardly through the septum into the internal volume of the elution column.

17 Claims, 15 Drawing Sheets

(56) References Cited

U.S. PATENT DOCUMENTS

| | | | | |
|---|---|---|---|---|
| 3,783,291 | A | 1/1974 | Czaplinski et al. | |
| 4,041,317 | A | 8/1977 | Morcos et al. | |
| 4,239,970 | A | 12/1980 | Eckhardt et al. | |
| 5,431,067 | A * | 7/1995 | Anderson ............ | G01N 1/2035 73/863.86 |
| 8,866,104 | B2 | 10/2014 | Mayfield et al. | |
| 9,240,253 | B2 | 1/2016 | Varnedoe et al. | |
| 2012/0305800 | A1 | 12/2012 | Mayfield et al. | |
| 2013/0029073 | A1* | 1/2013 | Mayfield ............... | A61J 1/2089 428/34.1 |
| 2015/0123021 | A1 | 5/2015 | Isensee | |
| 2015/0279490 | A1 | 10/2015 | Morcos et al. | |
| 2018/0244535 | A1 | 8/2018 | Russell, II et al. | |

FOREIGN PATENT DOCUMENTS

| | | | |
|---|---|---|---|
| CN | 105419238 | A | 3/2016 |
| WO | 2015066356 | A1 | 5/2015 |

OTHER PUBLICATIONS

Bailey, R. et al., "Enhancing Design of Immobilized Enzymatic Microbioreactors Using Computational Simulation,", Applied Biochemistry and Biotechnology, vol. 121-124: 639-653 (2005).

Chen, A-N et al., "Fabrication of porous fibrous alumina ceramics by direct coagulation casting combined with 3D printing," Ceramics International, vol. 44(5): 4845-4852 (2018).

Clark, B. et al., "Use of a closed system drug-transfer device eliminates surface contamination with antineoplastic agents," Journal of Oncology Pharmacy Practice, 6 pages (2013).

Cyclic Olefin Polymer—Advantages versus Glass for Parenteral Drug Packaging/Delivery—a Brief Analysis, 5 pages (2017).

Daikyo, Crystal Zenith, The Clear Solution, Product Information, West 17 pages (2015).

Eagle Foam Filters, <http://eagle-esi.com/products/ceramic-foam-filters/>, 6 pages.

Induceramic Foam Filters <http://www.induceramic.com/industrial-ceramics-application/machinery-and-industrial-equipment/filter-material/ceramic-foam-filters>, 6 pages, 2006-2022.

International Search Report and Written Opinion, PCT/US2021/065296, dated Apr. 1, 2022, 7 pages.

KIEZ Technology, ALTEC 1, Alumina Based Filters, http://www.kiezteknoloji.com/altec1_detail.html, retrieved May 3, 2022, 3 pages.

Lantheus Medical Imaging, TechneLite® Technetium Tc 99m Generator, 15 pages. Feb. 2014.

Lattice Filtration, 3D printed ceramic filters for molten metal, http://christyrefractories.com/refractory-products/other-products/lattice-filtration/, retrieved on May 3, 2022, 2 pages.

Leece, A. et al., "A container closure system that allows for greater recovery of radiolabeled peptide compared to the standard borosilicate glass system," Applied Radiation and Isotopes, vol. 80: 99-102 (2013).

MaxZero needleless connector, 2 pages (2014).

Rosinha, I. et al., "Topology optimization for biocatalytic microreactor configurations," Computer Aided Chemical Engineering, vol. 37: 1463-1468 (2015).

Schott Vials, 28 pages.

Schwarz minimal surface, https://en.wikipedia.org/wiki/Schwarz_minimal_surface, retrieved on May 2, 2022.

Solutions for collecting, transporting and processing your urine specimens, BD Vacutainer, Family of Products, 12 pages (2009).

Superior Safety and Ease of Use Equashield, 8 pages (2017).

Triply Periodic Minimal Surfaces, http://facstaff.susqu.edu/brakke/evolver/examples/periodic/periodic.html, retrieved May 2, 2022, 7 pages.

Extended European Search Report, European Application No. 21916340.9, dated Oct. 14, 2024, 6 pages.

* cited by examiner

COAXIAL NEEDLE TECHNETIUM ELUTION GENERATOR

CLAIM OF PRIORITY

This application claims priority to U.S. provisional patent application No. 63/131,554 filed Dec. 29, 2020, the disclosure of which is incorporated by reference herein.

TECHNICAL FIELD

The presently disclosed invention relates generally to systems for producing radioisotope targets in nuclear reactors and, more specifically, to systems for eluting Technetium-99m from irradiated radioisotope targets.

BACKGROUND

Technetium-99m (Tc-99m) is the most commonly used radioisotope in nuclear medicine (e.g., medical diagnostic imaging). Tc-99m (m is metastable) is typically utilized with patients and, when used with certain equipment, is used to image the patients' internal organs. However, Tc-99m has a half-life of only six (6) hours. As such, readily available sources of Tc-99m are of particular interest and/or need in at least the nuclear medicine field.

Given the short half-life of Tc-99m, Tc-99m is typically obtained at the location and/or time of need (e.g., at a pharmacy, hospital, etc.) via a Mo-99/Tc-99m generator. Mo-99/Tc-99m generators are devices used to extract, or elute, the metastable isotope of technetium (i.e., Tc-99m) from a source of decaying molybdenum-99 (Mo-99) by passing saline through the Mo-99 material. Mo-99 is unstable and decays with a 66-hour half-life to Tc-99m. Mo-99 is typically produced in a high-flux nuclear reactor from the irradiation of highly enriched uranium targets (93% Uranium-235) and shipped to Mo-99/Tc-99m generator manufacturing sites after subsequent processing steps to reduce the Mo-99 to a usable form, such as titanium-molybdate-99 (Ti—Mo99). Mo-99/Tc-99m generators are then distributed from these centralized locations to hospitals and pharmacies throughout the country. Since Mo-99 has a short half-life and the number of existing production sites is limited, it is desirable both to minimize the amount of time needed to reduce the irradiated Mo-99 material to a useable form and to increase the number of sites at which the irradiation process can occur.

As shown in FIG. 14, existing elution generators typically include an elution column 10 having an inlet 12 connected to a first end of the column and an outlet 14 connected at the other end of the column, meaning the elution column has flow in only a single direction. As such, known elution columns necessarily have the material 16 to be eluted and the filter medium 18 disposed in line within the columns, leading to an elongated elution column. Elution columns require adequate shielding 20 to protect medical field radiological workers from exposure during handling of the generator and the elution process. As such, the shielding of known elution columns tends to be both bulky as well as heavy, leading to increased transportation and handling costs.

There at least remains a need, therefore, for a system and a process for producing a titanium-molybdate-99 material suitable for use in Tc-99m generators in a timely manner.

SUMMARY OF THE INVENTION

One embodiment of the present disclosure provides an elution generator including an elution column having a container defining an interior volume and a septum that seals an opening to the interior volume, a radiation shield having an upper shield portion defining a central recess and a coaxial flow needle assembly extending downwardly into the central recess, and a lower shield portion having a base and a body portion extending upwardly therefrom, the body portion defining a central recess that is configured to receive the elution column therein, wherein the elution column is disposed in the central recess of the lower shield portion, the body portion of the lower shield portion is disposed in the central recess of the upper shield portion, and the coaxial flow needle extends downwardly through the septum into the internal volume of the elution column.

Another embodiment of an elution generator comprising an elution column having a container defining an interior volume, a septum that seals an opening to the interior volume, a bottom filter media disposed adjacent a bottom of the container, a top filter media disposed adjacent a top of the container, a coaxial flow needle assembly including a coaxial flow needle with an inner needle and an outer needle, the outer needle being coaxially disposed about the inner needle, and a lowermost portion of the inner needle extends downwardly into the bottom filter media, and a lowermost portion of the outer needle extends downwardly into the upper filter media.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements.

Figure 1B:
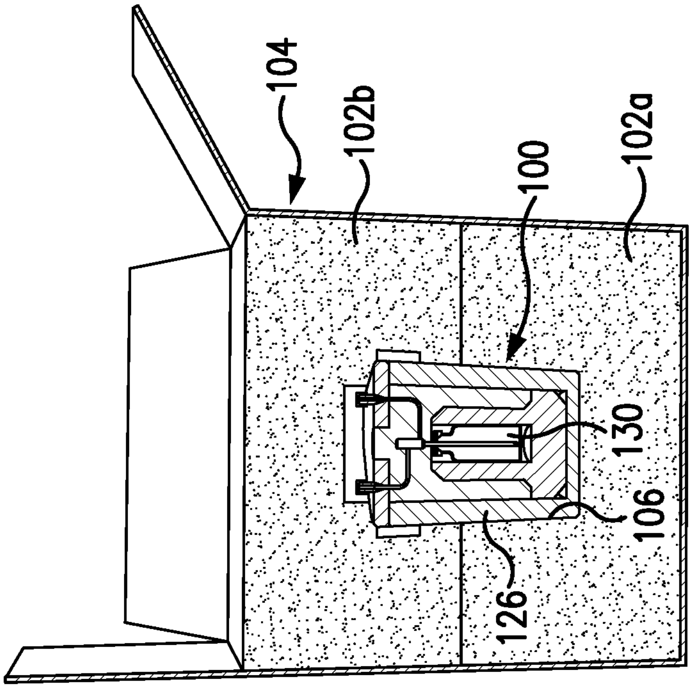
FIGS. 1A, 1B, and 1C are views of a coaxial needle technetium elution generator in accordance with an embodiment of the present invention, disposed in packaging.

Repeat use of reference characters in the present specification and drawings is intended to represent same or analogous features or elements of the invention according to the disclosure.

DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 5B:
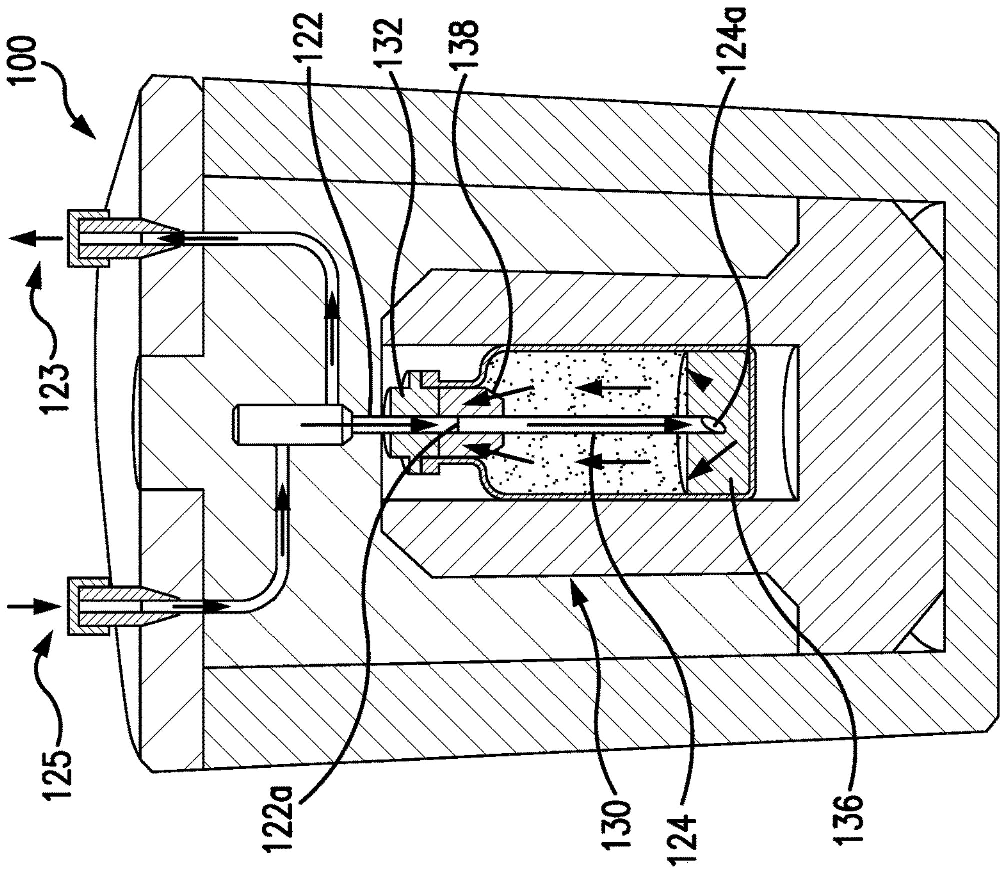
FIGS. 5A and 5B are cross-sectional views of the elution generator shown in FIGS. 2A through 2C.
Figure 5A:
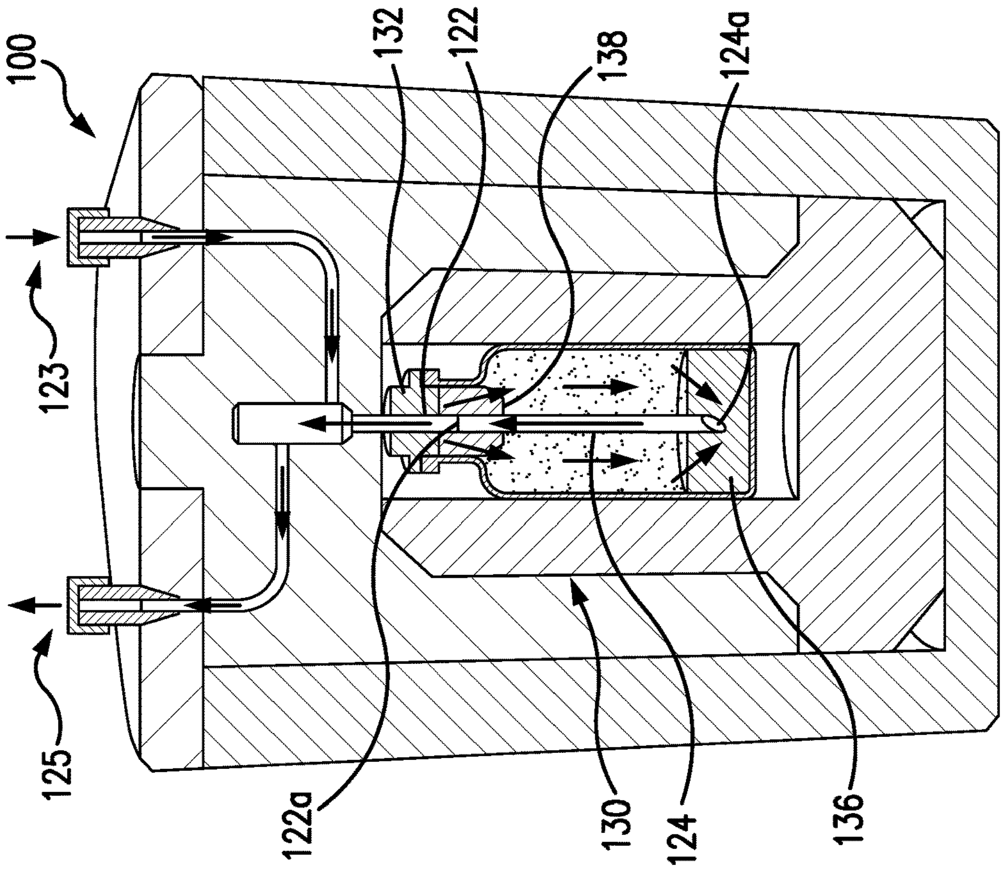

As used herein, terms referring to a direction or a position relative to the orientation of the coaxial needle technetium elution generator, such as but not limited to "vertical," "horizontal," "top," "bottom," "above," or "below," refer to directions and relative positions with respect to the elution generator's orientation in its normal intended operation, as indicated in FIGS. 1B, 5A, and 5B. Thus, for instance, the terms "vertical" and "top" refer to the vertical orientation and relative upper position in the perspective of FIGS. 1B, 5A, and 5B and should be understood in that context, even with respect to an elution generator that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "and," and "the" may include plural references, and the meaning of "in" may include "in" and "on." The phrase "in one embodiment," as used herein, does not necessarily refer to the same embodiment, although it may.

Figure 1A:
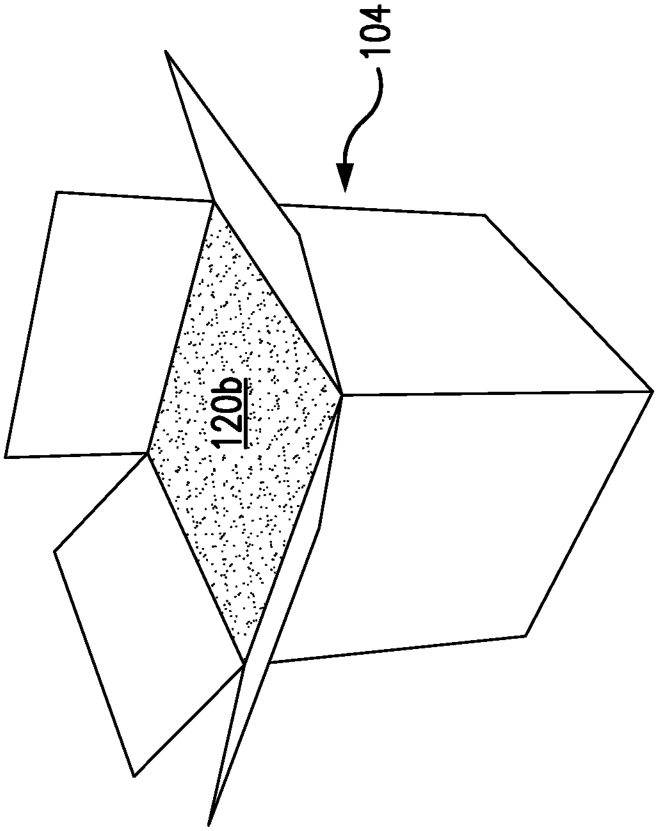
Figure 1C:
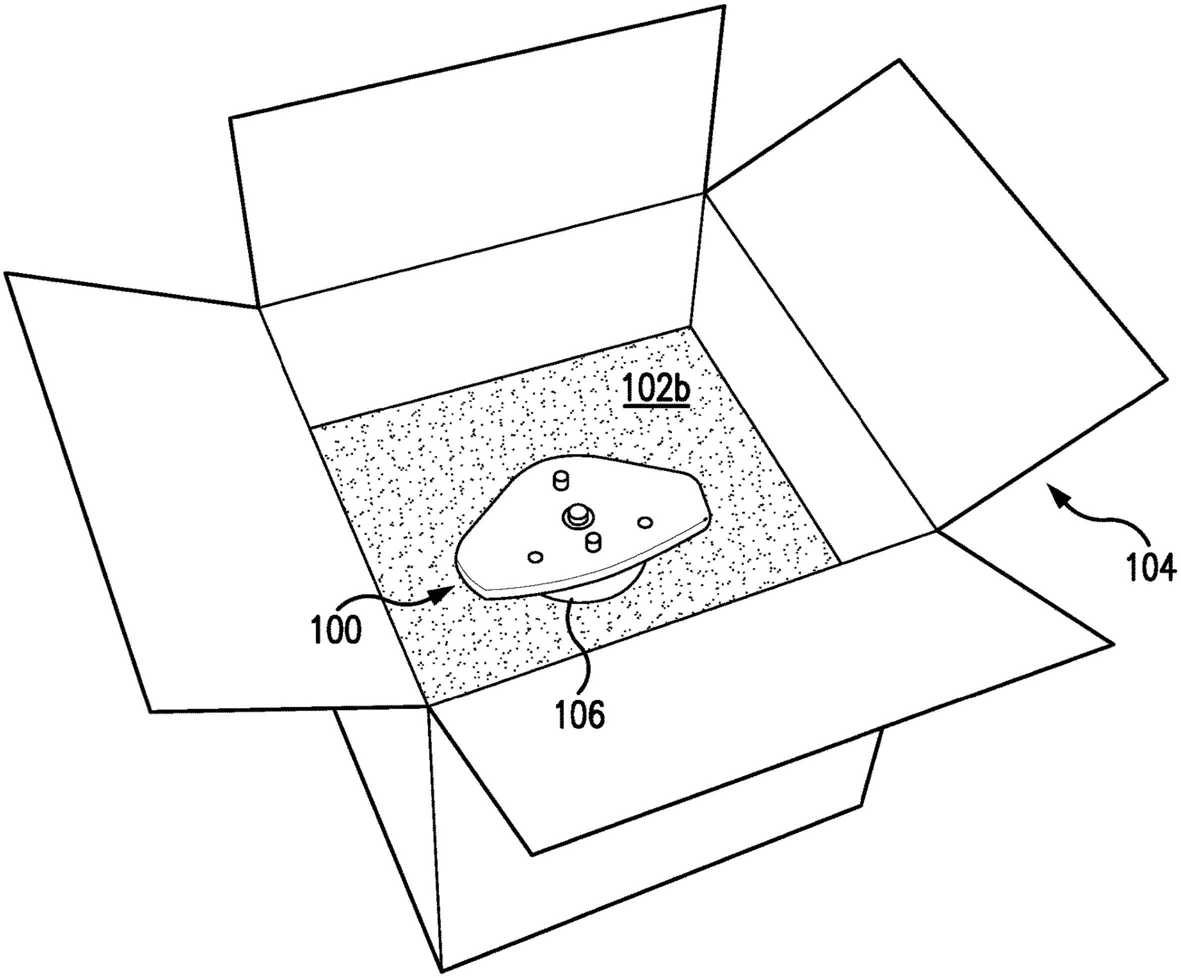

Referring now to FIGS. 1A through 1C, an elution generator 100 in accordance with the present disclosure is shown in its corresponding packing materials for transportation. As shown, the elution generator 100 is disposed within polyurethane foam interior packaging 102 that is then received in a double-wall, heavy duty cardboard box 104 exterior. Preferably, the cardboard box meets at least a 51 lbs per square inch, edge crushed test (ECT) standard, which is comparable to a 275 lb burst strength. As shown, the elution generator 100 is preferably nested within a foam bottom portion 102*a* and a foam upper portion 102*b*. In addition to the recesses 106 configured to receive the elution generator 100, additional recesses (not shown) may be provided for receiving vials and other consumables for shipment with the elution generator.

Figure 2B:
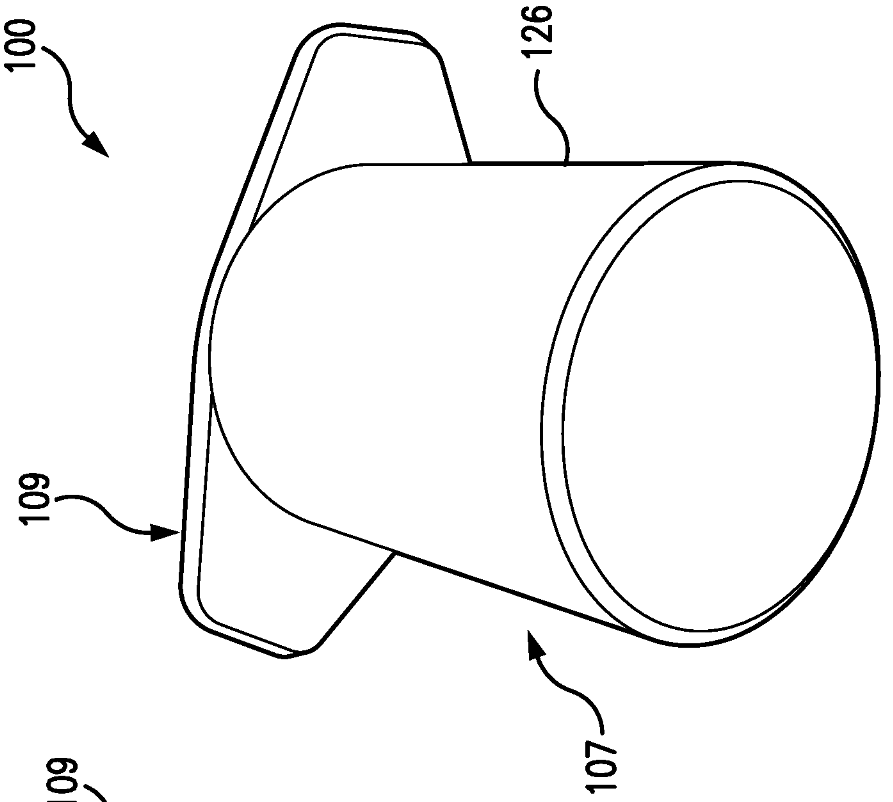
FIGS. 2A, 2B, and 2C are two perspective views and a cross-sectional view, respectively, of the elution generator shown in FIGS. 1A, 1B, and 1C.
Figure 2A:
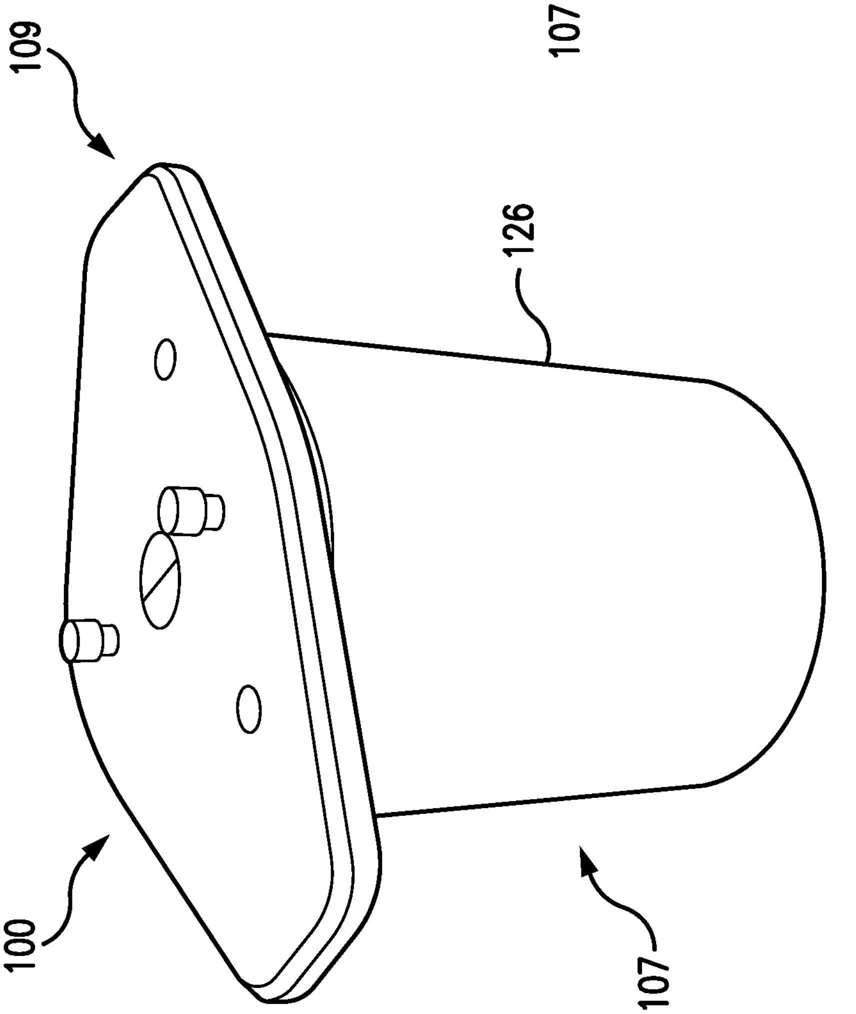
Figure 2C:
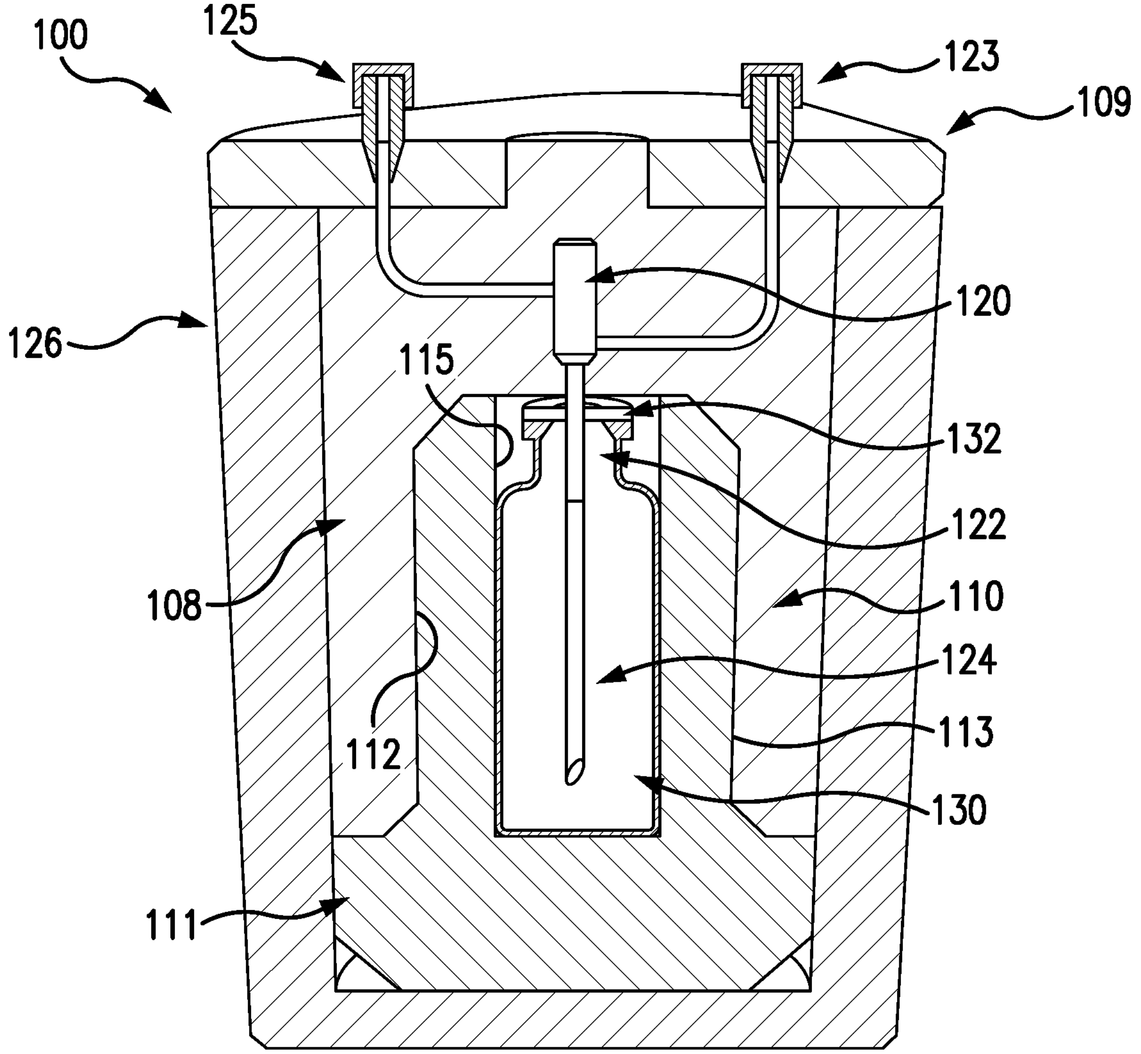

Referring now to FIGS. 2A through 2C, an exemplary embodiment of the elution generator 100 includes a radiation shield assembly 107 including an upper shield portion 108 and a lower shield portion 110 that is configured to be slidably received within a recess 112 formed within the upper shield portion 108. Preferably, both the upper shield portion 108 and the lower shield portion 110 are formed from depleted uranium so as to provide adequate shielding to workers from the eluted material. In alternate embodiments, tungsten or other high-density materials may be utilized for the shield portions.

Figures 6A, 6B:
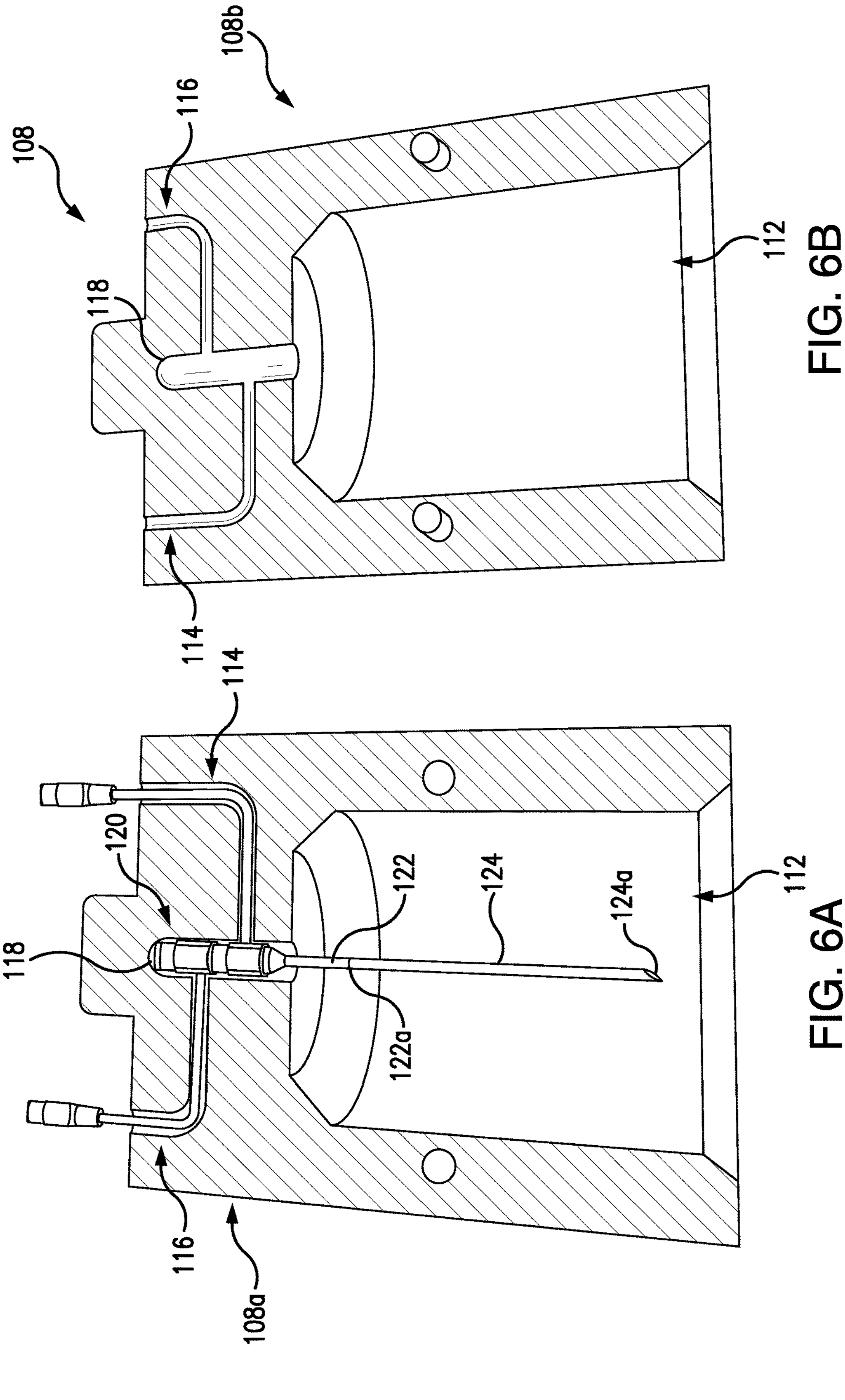
FIGS. 6A and 6B are side views of the upper shield halves of the elution generator shown in FIGS. 2A through 2C.

Referring additionally to FIGS. 6A and 6B, the upper shield portion 108 is formed of a first half 108a and a second half 108b, and is configured to receive a coaxial flow needle assembly 120 (FIG. 3) therein, the coaxial flow needle assembly 120 including a coaxial flow needle formed by an outer needle 122 and an inner needle 124, and first and second ports 123 and 125, respectively. As shown, the upper shield portion 108 includes a first flow path 114 and a second flow path 116 that are disposed radially-outwardly, or off-center from, a centrally located needle recess 118 that is configured to receive the coaxial flow needle formed by both the outer needle 122 and the inner needle 124 therein. As such, there is no direct path through the upper shield portion 108 formed by either pathway from the elution generator to the external environment through which radiation may be transmitted in a straight line without encountering a portion of the radiation shield 107. As shown, the upper shield portion 108 includes an integral handle 109 formed of 7075-T6 aluminum to assist in handling of the elution generator 100. Alternately, a strap handle of flexible material may be utilized rather than a rigid handle.

Figure 7A:
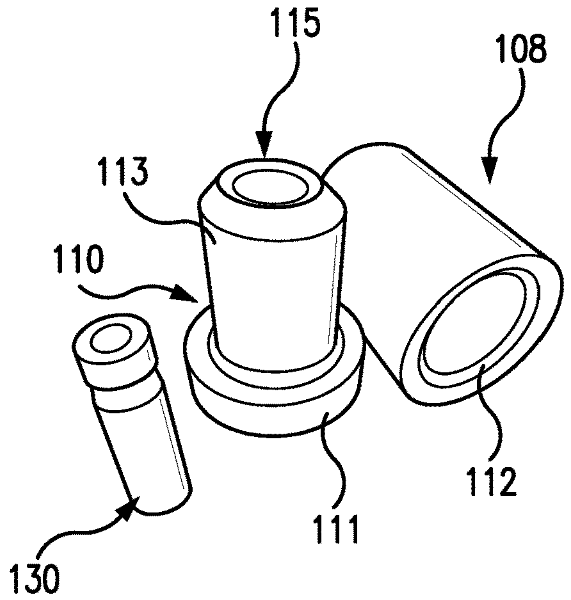
FIGS. 7A, 7B, and 7C are perspective views of the upper and lower shields of the elution generator shown in FIGS. 2A through 2C.
Figure 7B:
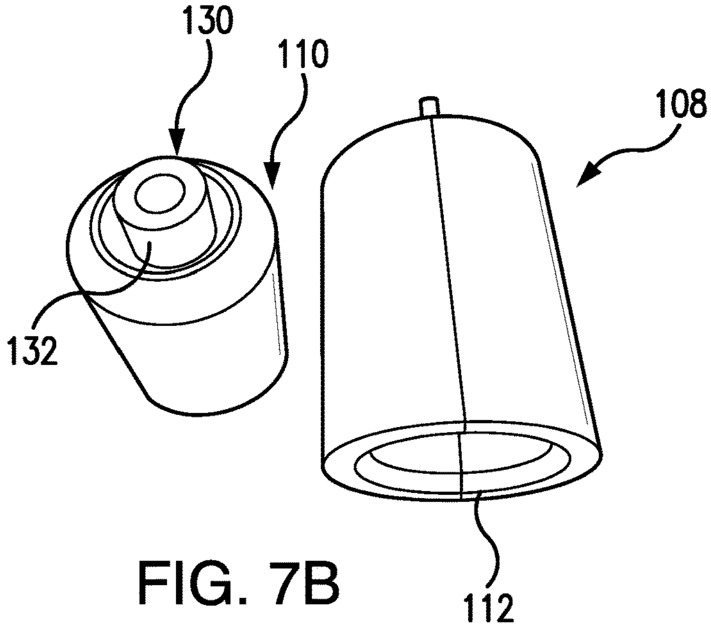
Figure 7C:
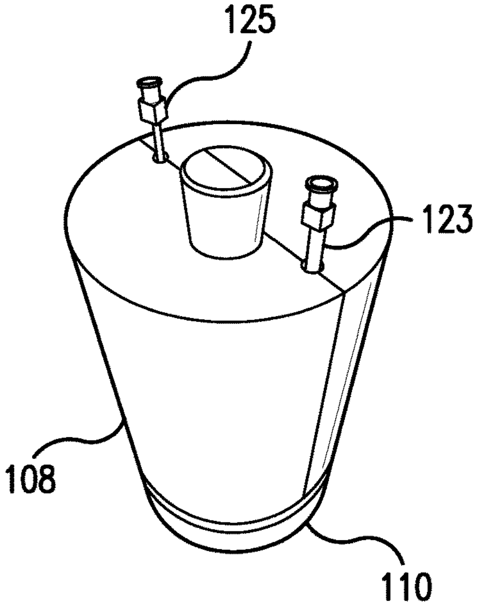
Figure 8:
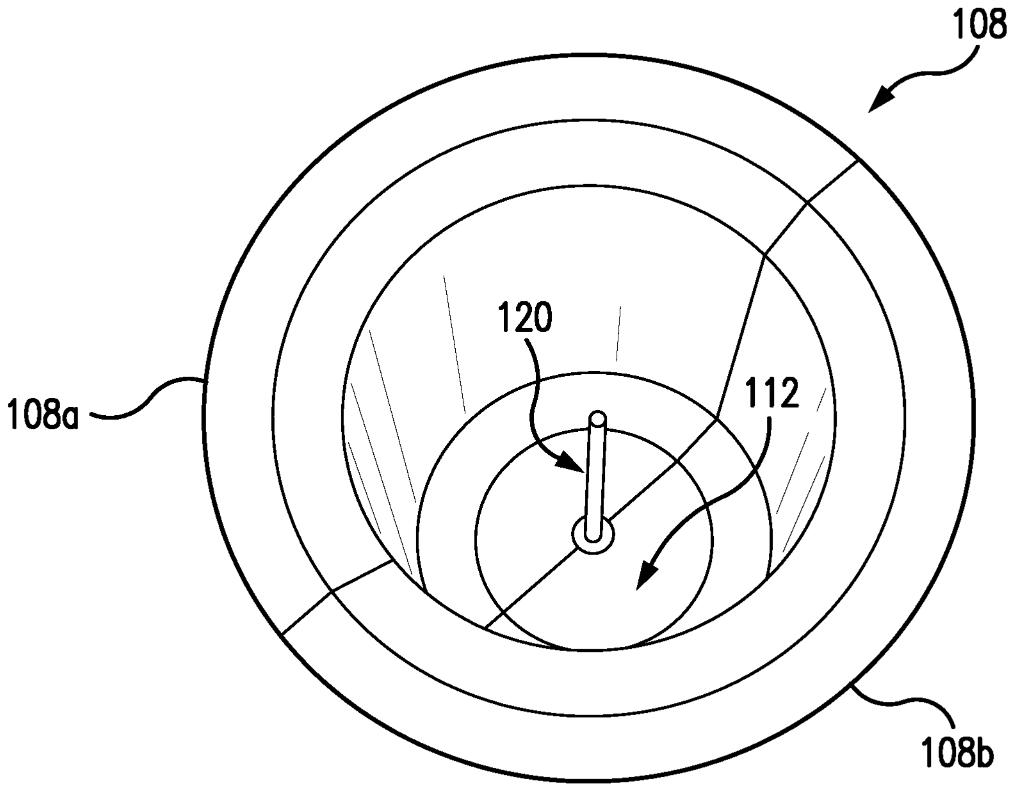
FIG. 8 is a bottom perspective view of the upper shield of the elution generator shown in FIGS. 2A through 2C.

Referring additionally to FIGS. 7A and 7B, the lower shield portion 110 includes a base 111 and a cylindrical side wall 113 extending upwardly therefrom that preferably forms a cylindrical recess 115 for receiving an elution column 130 therein. Note, the horizontal cross-sectional shape of the recess 115 is dependent on the horizontal cross-sectional shape of the elution column received therein. As best seen in FIG. 2C, the elution column 130 is disposed in the recess 115 of the lower shield portion 110 prior to the cylindrical wall 113 of the lower shield portion 110 being slidably received within the recess 112 of the upper shield portion 108, as discussed in greater detail below. In the embodiment shown, the elution column 130 includes a glass or polycarbonate vial and a crimp cap 132 with septum. Prior to shipping, upper shield portion 108 and lower shield portion 110 are assembled disposed within an outer plastic shield 126, formed of materials such as, but not limited to, Delrin, polyethylene, polyoxymethylene, and polyethylene terephthalate glycol plastics, which is then placed within the polyurethane foam packaging 102.

Figure 3:
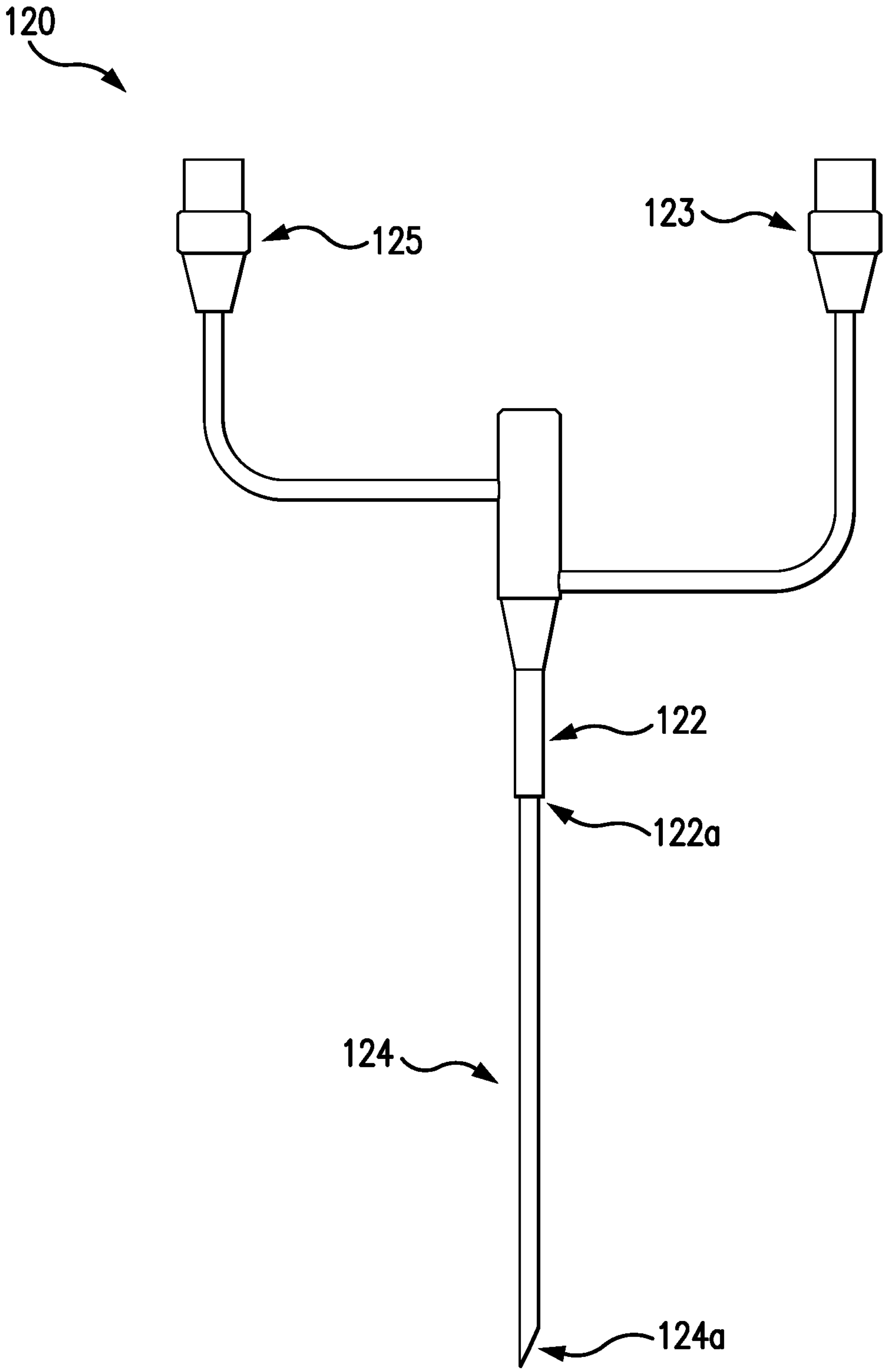
FIG. 3 is a side view of a coaxial needle assembly of the elution generator shown in FIG. 2C.

Referring now to FIG. 3, an example coaxial flow needle assembly 120 in accordance with the present disclosure is shown. As previously noted, coaxial needle 120 includes a first port 123 and a second port 125, the first port 123 being in fluid communication with the outer needle 122 and the second port 125 being in fluid communication with the inner needle 124. Note, either port can be used as the inlet or the outlet dependent upon whether the inflow of saline is provided through the outer needle 122, as shown in FIG. 5A, or through the inner needle 124, as shown in FIG. 5B. As previously noted, and as best seen in FIGS. 6A and 6B, the coaxial needle assembly 120 is received in corresponding recesses 114, 116, and 118 formed in the two halves of the outer shield portion 108, with the outer and inner needles 122 and 124 extending downwardly into the recess 112 in which the cylindrical side wall 113 of lower shield portion 110 is slidably received. As best seen in FIGS. 5A and 5B, an alumina filter media 136 is provided in the bottom portion of the vial of the elution column 130 such that the lowermost portion 124*a* of the inner needle 124 extends downwardly into the bottom filter media 136. Additionally, alumina filter media 138 is provided at the lowermost portion 122*a* of the outer needle 122 such that the lower and upper filter media 136 and 138 may capture the powdered material being eluted prior to the eluate exiting the elution column 130 through either the first port 123 or the second port 125 via the outer or inner needles 122 and 124.

Figure 10:
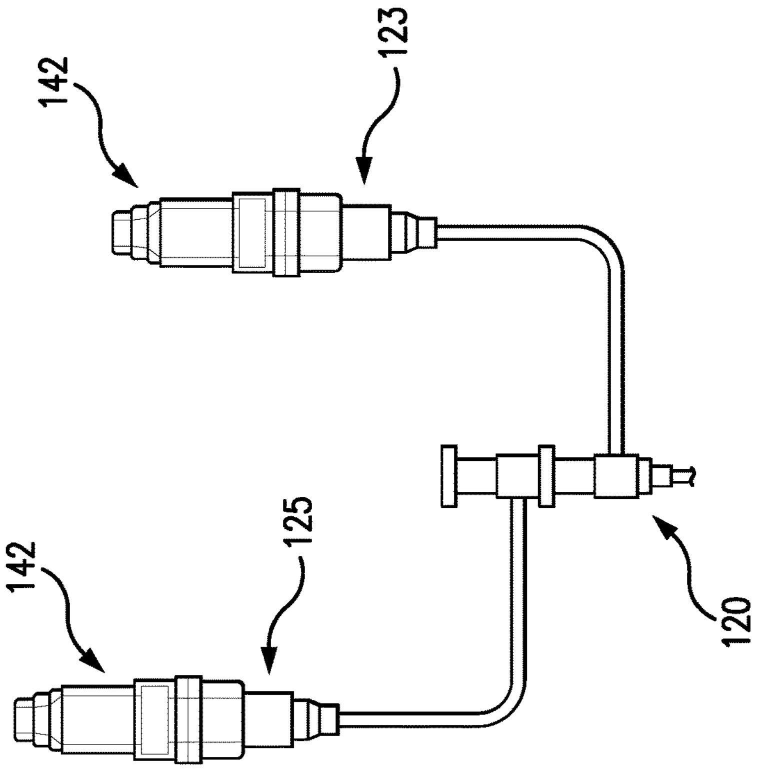
FIG. 10 is a side view of the inlet and outlet of the coaxial needle of the elution generator shown in FIGS. 2A through 2C, including luer locks.
Figure 9:
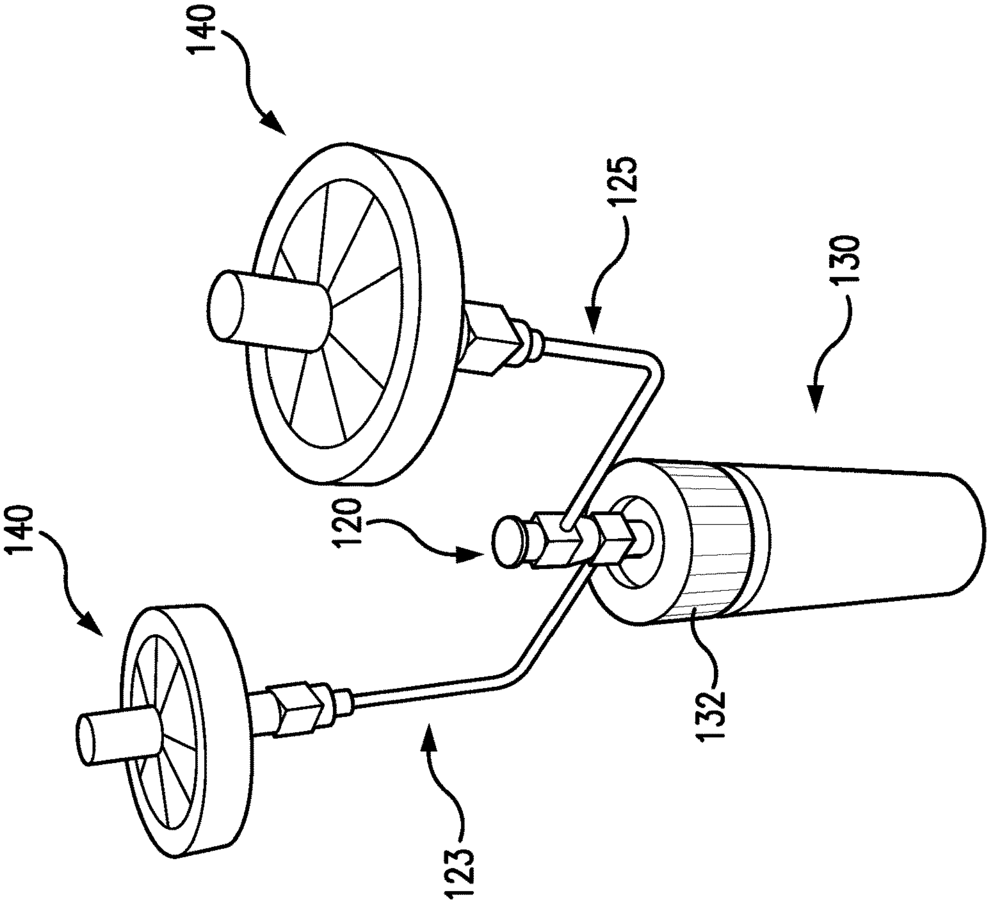
FIG. 9 is a perspective view of the elution column of the elution generator shown in FIGS. 2A through 2C, including inlet and outlet filters.

Referring additionally to FIG. 9, additional filters 140 may be provided on the first port 123 and second port 125 of the coaxial needle 122 to further trap any fines that may be present in the eluate. Preferably, 1 to 2 μm filters are provided on the first and second ports 123 and 125 to trap fires, although alternately sized filters may be used. Additionally, as shown in FIG. 10, needleless connectors 142, such as those manufactured by BD MaxZero may be used on the first and second ports 123 and 125 of the coaxial needle assembly 120 to assist in keeping the ports sterile and reduce the chances of needle pricks by workers.

Figure 4:
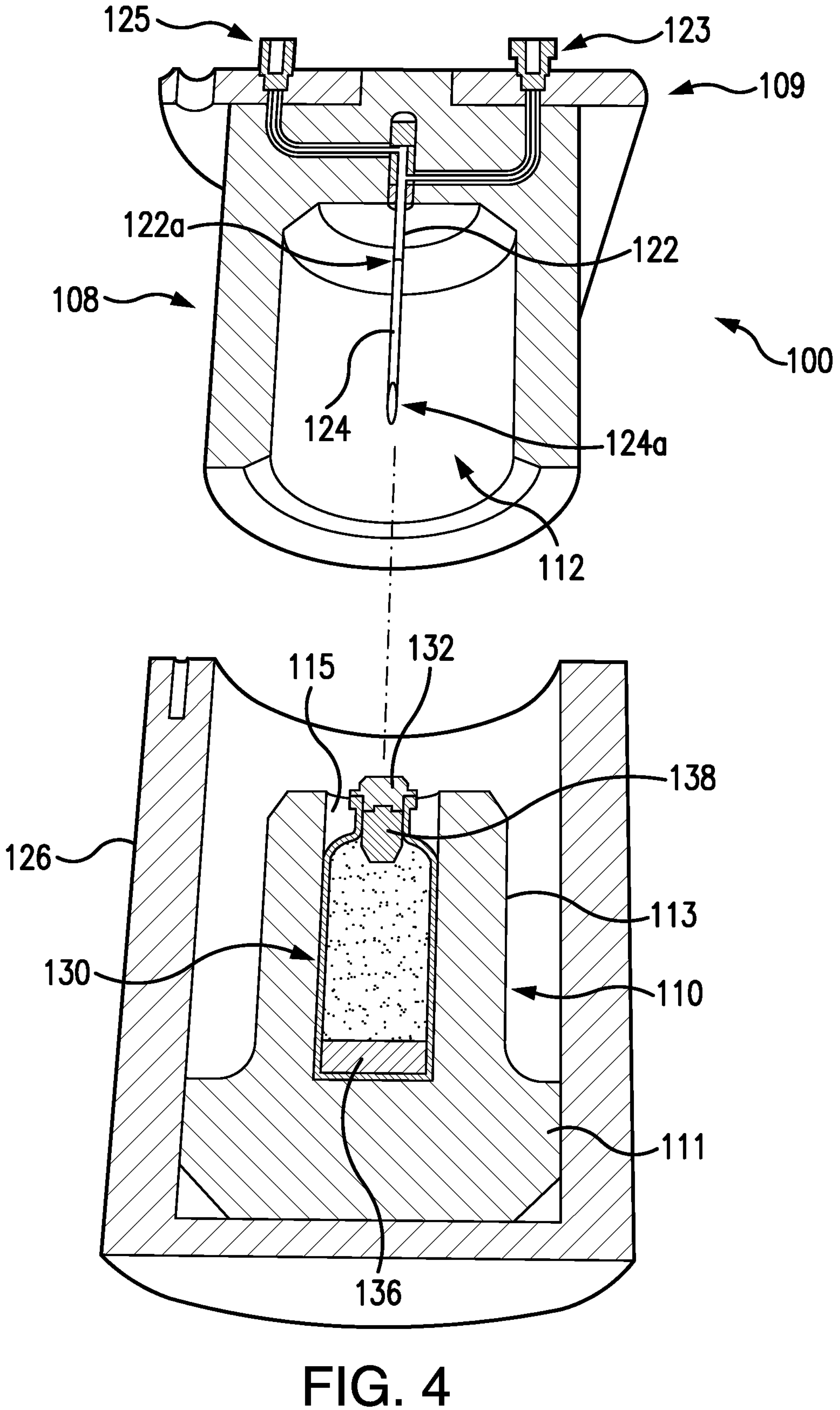
FIG. 4 is an exploded, cross-sectional view of the elution generator shown in FIG. 2C.

Referring now to FIG. 4, assembly of the elution generator 100 may preferably be performed robotically to lessen the potential exposure of workers to radiation. First, with the lower shield portion 110 disposed within the outer plastic shield 126, the elution column 130 is robotically picked up and deposited in the recess 115 of the lower shield portion 110. Preferably, an isopropyl wipe system is utilized to sterilize the septum of the elution column 130. Next, a robotic gripper retrieves the upper shield portion 108 which has been preassembled with a sterilized coaxial needle assembly 120 installed. The upper shield portion 108 is lowered into the outer plastic shield 126 such that the cylindrical side wall 113 of the lower shield portion 110 is slidably received in the recess 112 of the upper shield portion 108. As the upper shield portion 108 is lowered, the bottommost portion 124*a* of the inner needle 124 punctures the septum of the elution column 130 and passes through the material to be eluted until the lowermost portion 124*a* of the inner needle 124 is disposed within the bottom filter media 136 of the elution column, as shown in FIGS. 5A and 5B. The elution generator 100 is now ready to be placed within the foam packaging 102 and boxed for shipment to the destination at which the elution procedure takes place.

Figure 11B:
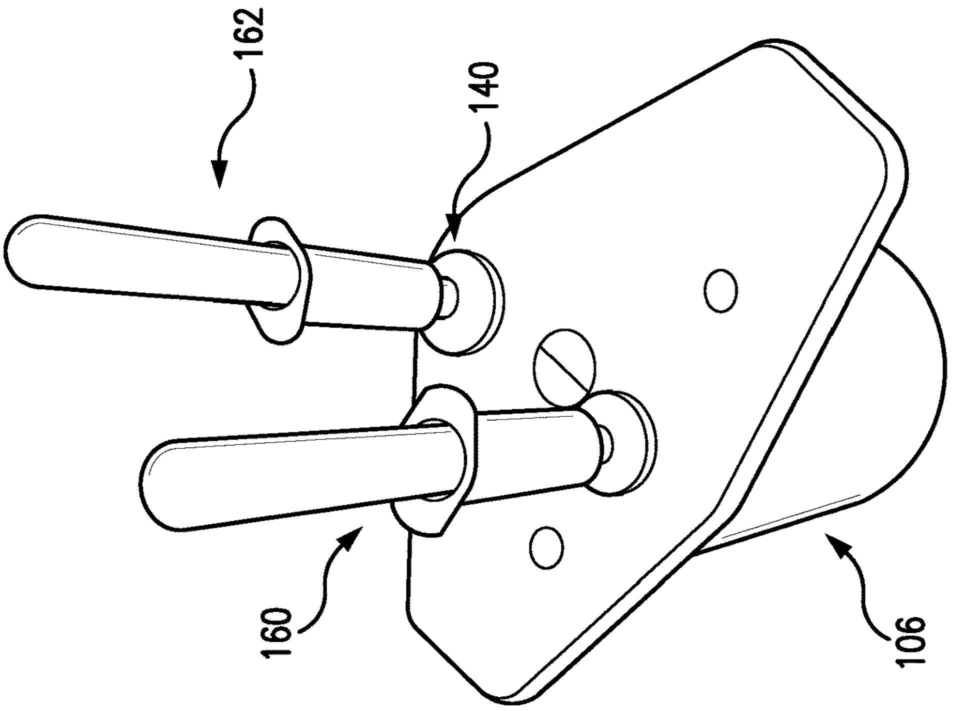
FIGS. 11A and 11B are perspective views of the elution generator shown in FIGS. 2A through 2C undergoing an elution process.
Figure 11A:
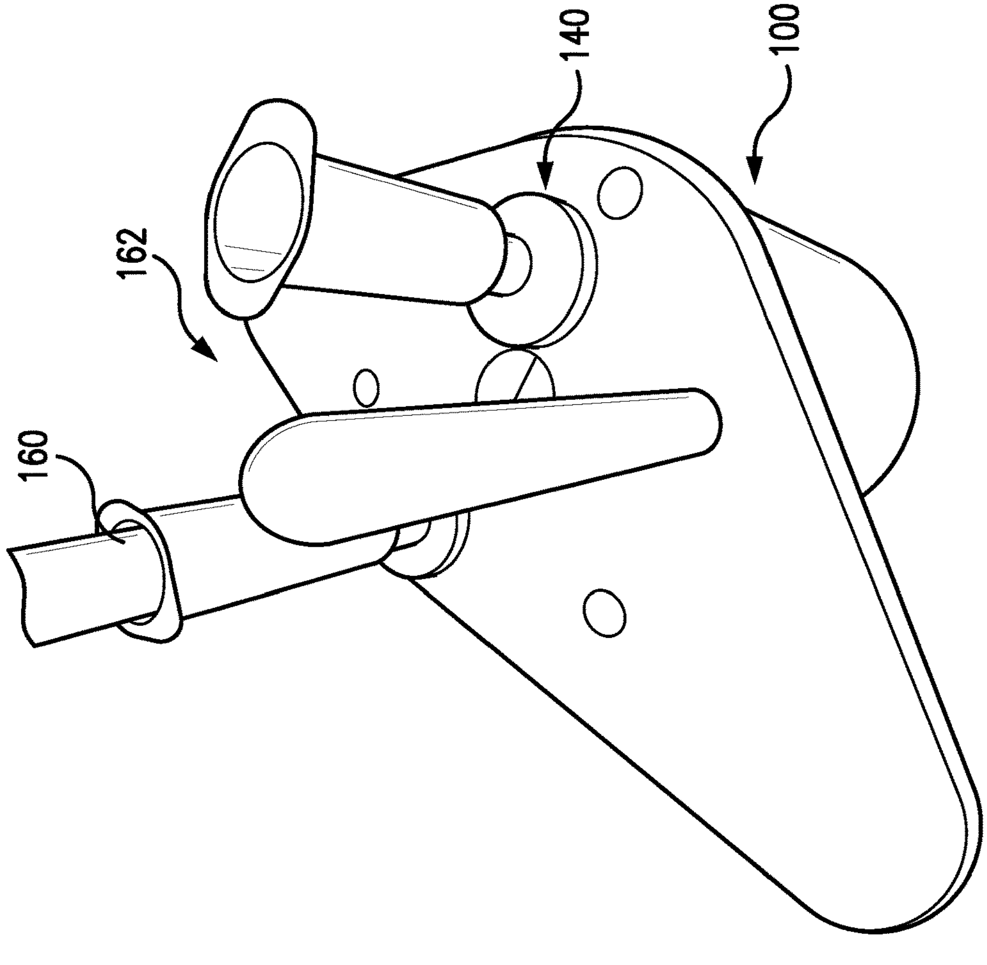
Figure 12:
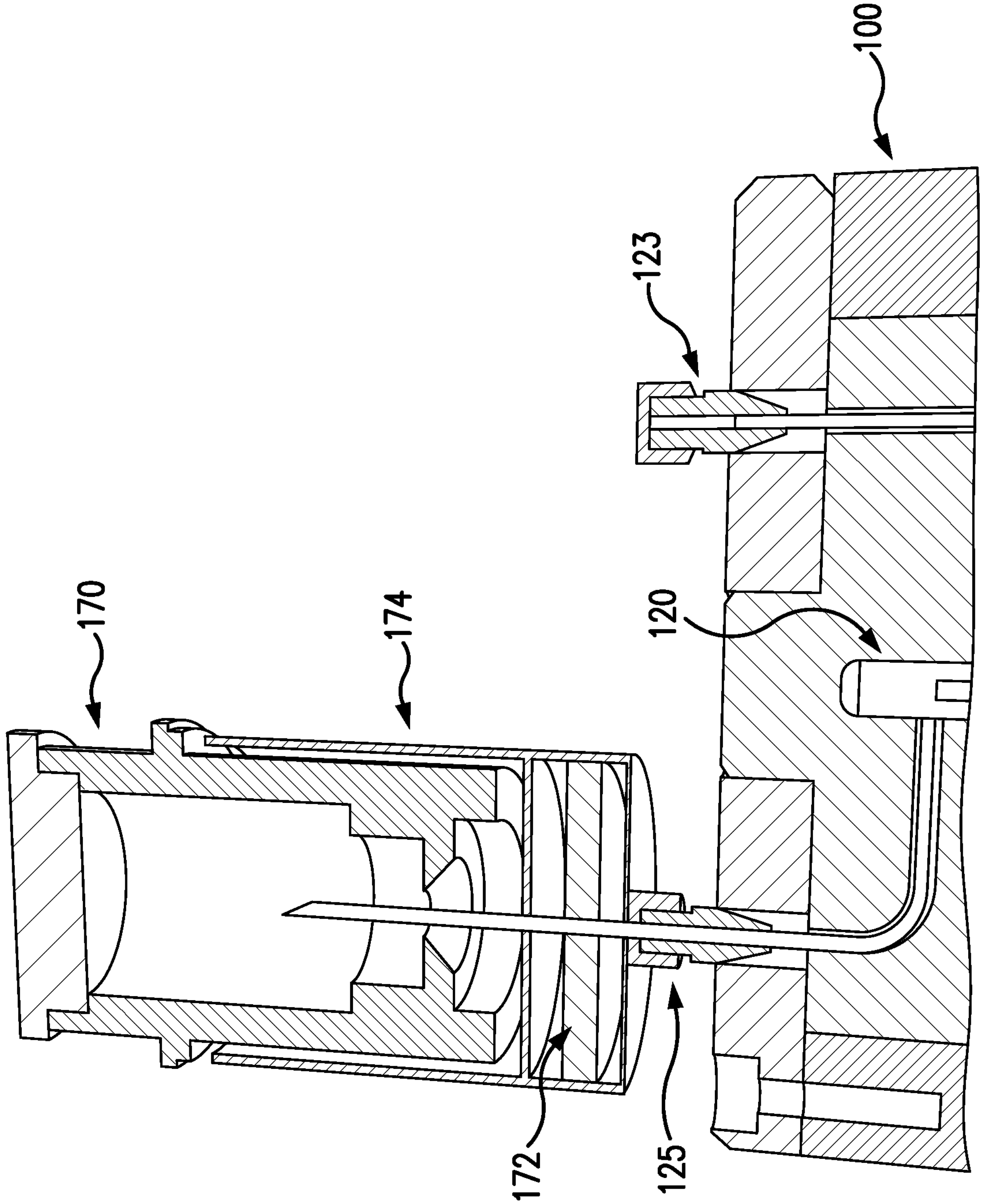
FIG. 12 is a partial cross-sectional view of an elution generator shown in FIGS. 2A through 2C including a shielded outlet.

Referring now to FIGS. 11A and 11B, the elution process may be performed with a vial tube 160 including a saline solution and an additional vial tube 162 that is at a vacuum, such as vial tubes used when drawing blood. First, the vial tube 160 including the saline solution is placed on the port of the coaxial needle assembly 120 (FIGS. 5A and 5B) that serves as the inlet, and the vial tube 162 at vacuum is then placed on the port of the coaxial needle assembly 120 that serves as the outlet. The vacuum present in the outlet vial tube 162 draws the saline solution downwardly into the elution column 130 and then upwardly back out of the elution column 130. As previously noted, as shown in FIG. 5A, the outer needle 122 may be used for inflow with the inner needle 124 being used for outflow or, conversely, the inner needle 124 may be used for inflow and the outer needle 122 used for outflow. As shown in FIG. 12, an outlet shield 170 may be provided on the port of the coaxial needle assembly 120 that is used to collect the eluate in order to provide protection to workers from exposure to radiation. As well, filter media 172 may be provided in a disposable needle access device 174 so that the filter media is readily replaceable.

Figure 13A:
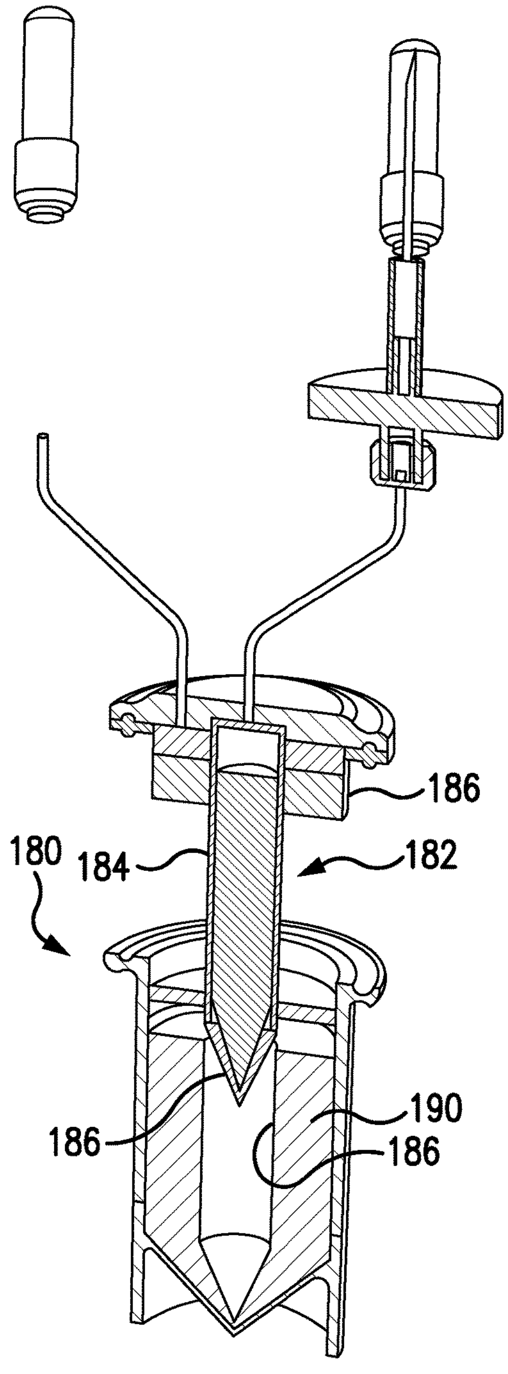
FIGS. 13A and 13B are cross-sectional views of an elution column in accordance with an alternate embodiment of the present invention.
Figure 13B:
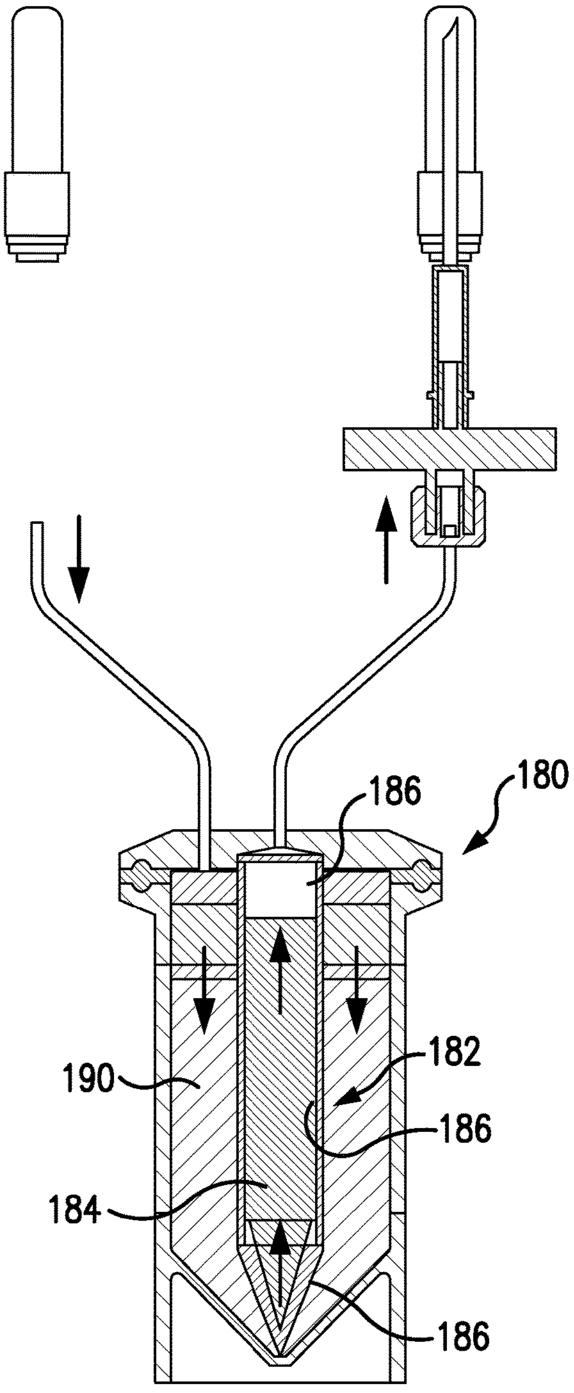
Figure 14:
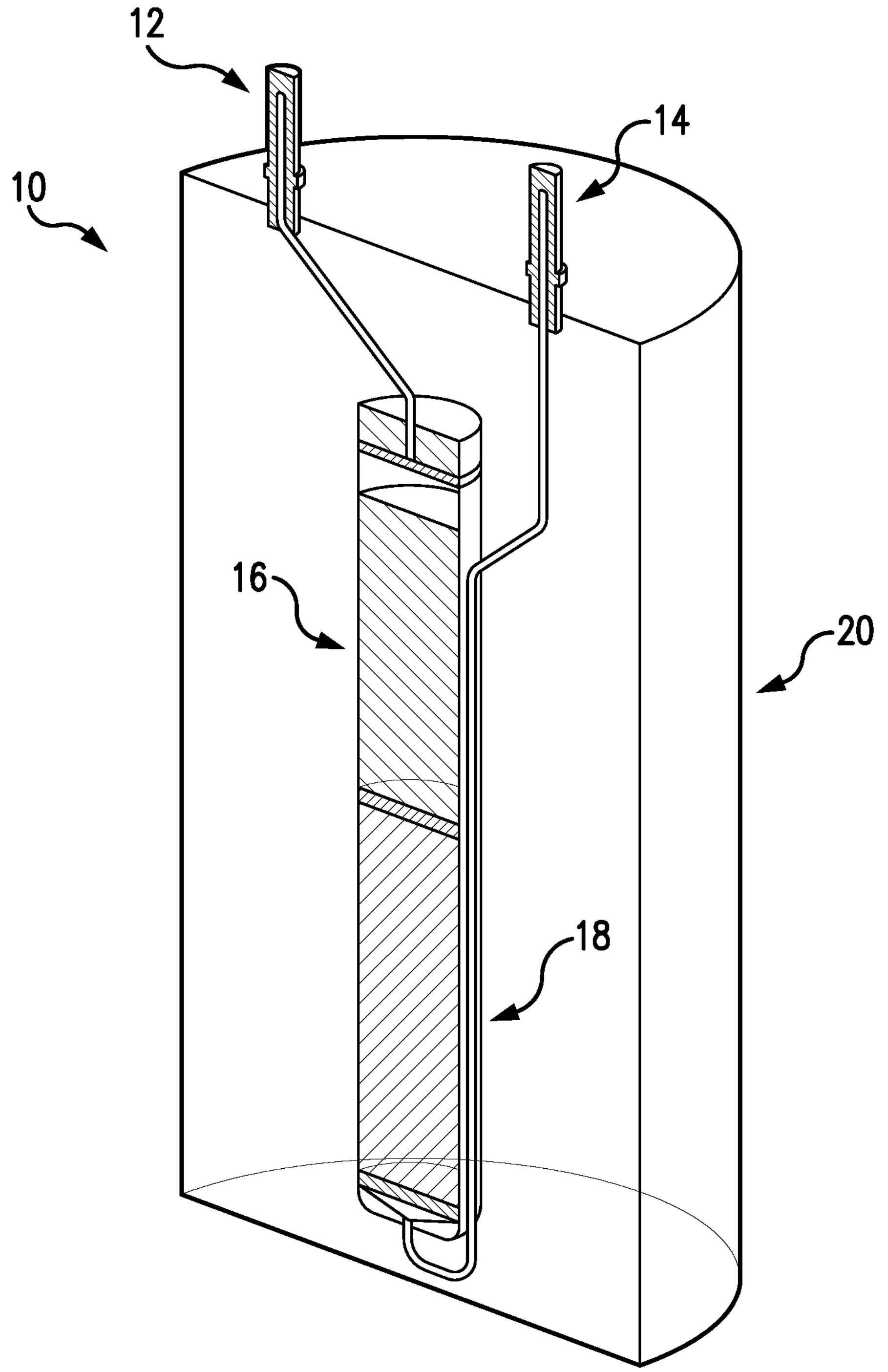
FIG. 14 (PRIOR ART)
FIG. 14 is a cross-sectional view of a prior art elution column.

Referring now to FIGS. 13A and 13B, an alternate embodiment of an elution column 180 in accordance with the present disclosure is shown. Similarly to the first disclosed embodiment, the elution column 180 shown in FIGS. 13A and 13B utilizes the coaxial flow of saline during the elution process. Note, however, although the flow within the elution column 180 is coaxial, the needle 182 utilized is not. Rather, a large diameter needle 182 is used in which material 184 to be eluted, namely Mo-99, is disposed within the interior volume of the needle 182. The large diameter needle is received in a corresponding recess 186 formed within the filter media 190, which extends the length of the large diameter needle 182. As shown, porous frets 186 are used at opposing ends of the large diameter needle 182 to further improve filtration of the eluate.

While one or more preferred embodiments of the invention are described above, it should be appreciated by those skilled in the art that various modifications and variations can be made in the present invention without department from the scope and spirit thereof. It is intended that the present invention cover such modifications and variations as come within the scope and spirit of the appended claims and their equivalents.

The invention claimed is:

1. An elution generator comprising:

an elution column having a container defining an interior volume in which an elutable material is located and a septum that seals an opening to the interior volume;

a radiation shield comprising:

an upper shield portion defining a central recess and a coaxial flow needle assembly including a coaxial flow needle extending downwardly into the central recess, and a lower shield portion having a base and a body portion extending upwardly therefrom, the body portion defining a central recess that is configured to receive the elution column therein, wherein the elution column is disposed in the central recess of the lower shield portion, the body portion of the lower shield portion is disposed in the central recess of the upper shield portion, and the coaxial flow needle extends downwardly through the septum into the internal volume of the elution column.

2. The elution generator of claim 1, wherein the coaxial flow needle further comprises an inner needle and an outer needle, the outer needle being coaxially disposed about the inner needle.

3. The elution generator of claim 2, wherein the upper shield portion further comprises a central needle recess, a first flow path, and a second flow path, and both the first flow path and the second flow path are disposed radially-outwardly from the central needle recess.

4. The elution generator of claim 3, wherein the coaxial flow needle is disposed in the central needle recess.

5. The elution generator of claim 4, wherein the coaxial flow needle assembly further comprises a first port and a second port, the first port being disposed in the first flow path of the upper shield portion and the second port is disposed in the second flow path of the upper shield portion.

6. The elution generator of claim 5, wherein a distal end of the first port is disposed externally to the radiation shield and a proximal end of the first port is in fluid communication with the outer needle, and a distal end of the second port is disposed externally to the radiation shield and a proximal end of the second port is in fluid communication with the inner needle.

7. The elution generator of claim 2, wherein the elution column further comprises a bottom filter media disposed adjacent a bottom of the container, a top filter media disposed adjacent a top of the container, and a lowermost portion of the inner needle extends downwardly into the bottom filter media, and a lowermost portion of the outer needle extends downwardly into the upper filter media.

8. The elution generator of claim 7, wherein the elutable material comprises an elutable powder disposed between the upper filter media and the bottom filter media.

9. The elution generator of claim 1, wherein the central recess of the upper shield portion and the central recess of the lower shield portion are cylindrical.

10. An elution generator comprising:

an elution column having a container defining an interior volume, a septum that seals an opening to the interior volume, a bottom filter media disposed adjacent a bottom of the container, a top filter media disposed adjacent a top of the container, the bottom filter media and the top filter media configured to filter an elutable material;

a coaxial flow needle assembly including a coaxial flow needle with an inner needle and an outer needle, the outer needle being coaxially disposed about the inner needle;

wherein a lowermost portion of the inner needle extends downwardly into and terminates in the bottom filter media, and a lowermost portion of the outer needle extends downwardly into and terminates in the upper filter media.

11. The elution generator of claim 10, further comprising:

a radiation shield having:

an upper shield portion defining a central recess, the coaxial flow needle of the coaxial flow needle assembly extending downwardly into the central recess, and a lower shield portion having a base and a body portion extending upwardly therefrom, the body portion defining a central recess that is configured to receive the elution column therein, wherein the elution column is disposed in the central recess of the lower shield portion and the body portion of the lower shield portion is disposed in the central recess of the upper shield portion so that the coaxial flow needle extends downwardly through the septum into the internal volume of the elution column.

12. The elution generator of claim 11, wherein the upper shield portion further comprises a central needle recess, a first flow path, and a second flow path, and both the first flow path and the second flow path are disposed radially-outwardly from the central needle recess.

13. The elution generator of claim 12, wherein the coaxial flow needle is disposed in the central needle recess.

14. The elution generator of claim 13, wherein the coaxial flow needle assembly further comprises a first port and a second port, the first port being disposed in the first flow path of the upper shield portion and the second port is disposed in the second flow path of the upper shield portion.

15. The elution generator of claim 14, wherein a distal end of the first port is disposed externally to the radiation shield and a proximal end of the first port is in fluid communication with the outer needle, and a distal end of the second port is disposed externally to the radiation shield and a proximal end of the second port is in fluid communication with the inner needle.

16. The elution generator of claim 10, wherein the elutable material comprises an elutable powder disposed between the upper filter media and the bottom filter media.

17. The elution generator of claim 10, wherein the central recess of the upper shield portion and the central recess of the lower shield portion are cylindrical.

* * * * *